United States Patent [19]

Intrater et al.

[11] Patent Number: 5,263,153

[45] Date of Patent: Nov. 16, 1993

[54] MONITORING CONTROL FLOW IN A MICROPROCESSOR

[75] Inventors: Amos Intrater, Netanya; Donald B. Alpert, Herzlia, both of Israel

[73] Assignee: National Semiconductor Corporation, Santa Clara, Calif.

[21] Appl. No.: 573,287

[22] Filed: Aug. 24, 1990

Related U.S. Application Data

[63] Continuation of Ser. No. 332,411, Mar. 30, 1989, abandoned, which is a continuation of Ser. No. 6,009, Jan. 22, 1987, abandoned.

[51] Int. Cl.⁵ ............................................. G06F 11/30
[52] U.S. Cl. .................................... 395/575; 395/375; 364/DIG. 1; 364/264; 364/264.2; 364/265.5; 364/265; 364/261.3
[58] Field of Search ............... 395/575, 375; 371/16.1, 371/19

[56] References Cited

U.S. PATENT DOCUMENTS

| | | | |
|---|---|---|---|
| 3,707,725 | 12/1972 | Dellheim | 364/200 |
| 4,108,359 | 8/1978 | Proto | 371/25 |
| 4,215,406 | 7/1980 | Gomola et al. | 364/200 |
| 4,224,690 | 9/1980 | Rockwell | 371/25 |
| 4,389,706 | 6/1983 | Gomola et al. | 364/200 |
| 4,435,759 | 3/1984 | Baum et al. | 364/200 |
| 4,520,440 | 5/1985 | Buonomo et al. | 364/200 |
| 4,792,918 | 12/1988 | Hirose et al. | 364/900 |
| 4,811,345 | 3/1989 | Johnson | 364/200 |

FOREIGN PATENT DOCUMENTS

| | | |
|---|---|---|
| 1441444 | 6/1976 | United Kingdom . |
| 1513946 | 6/1978 | United Kingdom . |
| 2136173A | 9/1984 | United Kingdom . |

*Primary Examiner*—Kevin A. Kriess
*Attorney, Agent, or Firm*—Limbach & Limbach

[57] ABSTRACT

A method for monitoring the sequence of instructions executed by a central processing unit. When a branch instruction is executed, the central processing unit generates a representative interface signal. When a jump instruction is executed or an exception occurs, the central processing unit displays representative information on the external memory interface.

16 Claims, 14 Drawing Sheets

FIG_15

MONITORING CONTROL FLOW IN A MICROPROCESSOR

This is a continuation of co-pending application Ser. No. 332,411 filed on Mar. 30, 1989 now abandoned, which is a continuation of parent application Ser. No. 006,009 filed on Jan. 22, 1987, now abandoned.

BACKGROUND OF THE INVENTION

1. Field of the Invention

The present invention relates to data processing systems and, in particular, to a method for monitoring the sequence of instructions executed by a microprocessor without adversely effecting its operation.

2. Discussion of the Prior Art

A microprocessor is useful only if it is possible for designers of systems incorporating the microprocessor to "debug" their systems. The system designer must have the capability to observe the operation of the system under development, identify differences between the system's operation and its defined functional specification and then correct the system's design so that its behavior matches the functional specification.

One important aspect of observing the system's operation is following the sequence of instructions executed by the microprocessor. The system designer must be able to follow the sequence of executed instructions without slowing the system or causing the instruction sequence to differ from normal system operation.

Microprocessors are commonly designed so that transfer of control from one instruction to the next is determined both by the location and type of instruction executed and by whether an exception occurs. Exceptions are events, errors and special conditions, such as an attempt to execute an illegal instruction or an interrupt request signalled by a peripheral device, which are detected by the microprocessor.

Instructions executed by a microprocessor may be classified into three types: branch instructions, jump instructions and "other" instructions.

"Branch" instructions are those instructions that potentially transfer control to an instruction at a destination address calculated by adding a displacement value encoded into the currently executing instruction to the address of the currently executing instruction. Branch instructions can be "unconditional" or "conditional"; in the latter case, a test is made to determine whether a specified condition concerning the state of the microprocessor is true. A branch instruction is said to be "taken" either if it is unconditional or if it is conditional and the specified condition is true.

"Jump" instructions are those instructions that potentially transfer control to an instruction at a destination address calculated in a general manner that depends on the definition of the particular instruction. Examples of common jump instructions are "RETURN", which transfers control to an address that is read from the top of the stack in memory, and "CASE", which transfers control to an address that is located by using an operand's value to index into a table of addresses in memory. Like branch instructions, jump instructions can be "unconditional" or "conditional" and are said to be "taken" either if unconditional or if conditional and the specified condition is true.

The significant distinction between branch and jump instructions is that, for branch instructions, it is possible to calculate the destination address knowing only the instruction's encoding and location, whereas for jump instructions, the destination address generally depends on some data value that can vary, such as the contents of a register or memory location. For microprocessors that do not integrate a cache memory or a memory management unit "on-chip", the virtual addresses of all instruction and data references are available on the external interface of the microprocessor. Consequently, it is a straightforward matter to follow externally the sequence of instructions executed by the microprocessor.

For example, in the case of the National Semiconductor Corporation NS32032 microprocessor, after executing a taken branch or jump instruction, the next instruction is read from the destination address in memory using a special status code. The microprocessor also activates a program flow status interface signal whenever it begins executing a new instruction. It is, therefore, possible for the NS32032 microprocessor to monitor the sequence of executed instructions as follows:

1 For each taken branch or jump instruction, the destination address is available on the external interface;

2. Following the execution of a taken branch or jump instruction, the program flow status interface signal is observed to determine the sequence of instructions executed at consecutive memory addresses until the next taken branch or jump is executed; and 3. Data reads from memory locations that store the addresses of exception service procedures are detected on the external interface to determine when an exception has occurred.

However, for a microprocessor such as that of the present invention, which integrates a cache memory and a memory management unit on-chip, there are two problems that must be solved in order to externally monitor the sequence of executed instructions. First, since required instructions or data may be found in on-chip cache memory, not all memory references are observable on the microprocessor's external interface. This is because memory references that are located in the microprocessor's internal cache are performed without referring to external memory. Second, memory references observable on the microprocessor's external interface use physical addresses rather than virtual addresses. This is because the integrated memory management unit translates the virtual addresses generated by an executing program to the physical addresses used to access memory. In some circumstances, the translation will not be 1-to-1; that is, more than one virtual address can be translated to a single physical address. In such cases, it is impossible to determine the virtual addresses of memory references for an executing program by merely observing the physical addresses of the memory references on the external interface.

SUMMARY OF THE INVENTION

The method of the present invention for solving the above-described problems involves two aspects. First, an additional interface signal is provided which indicates whether an instruction beginning execution is sequential or non-sequential. Second, additional information is provided on the interface signals used for external memory references.

The additional interface signal utilized by the microprocessor described in the following specification is called "Internal Sequential Fetch" (ISF). The microprocessor activates the ISF signal, along with a "Program Flow Status" (PFS) signal, whenever a taken branch or jump instruction is executed. It is, therefore, possible to monitor control flow when a branch or jump instruction is executed. If the instruction is taken, which is indicated by driving the ISF signal active, then control is transferred to a destination instruction. If the instruction is not taken, which is indicated by driving the ISF signal inactive, then control is transferred to the next sequential instruction in memory.

Additional information for monitoring control flow is provided on the external interface when an exception occurs or when a taken jump instruction is executed. When an exception occurs, the microprocessor displays both a code that indicates the type of exception and the virtual address of the exception service procedure. When a taken jump instruction is executed, the microprocessor displays the virtual address of the jump destination.

This solution provided by the present invention to the problem of monitoring control flow is extremely efficient. Since only one new interface signal is required, the cost is small. Since the interface signals for memory references are used infrequently, interference with the microprocessor's external references is small and performance is not significantly degraded. Taken jump instructions typically comprise less than 10% of executed instructions. Exceptions typically occur at a rate of less than 1 per 100 instructions. Consequently, using the interface signals to provide additional information for monitoring control flow has little effect on the microprocessor's performance.

DETAILED DESCRIPTION OF A PREFERRED EMBODIMENT

Figure 1:
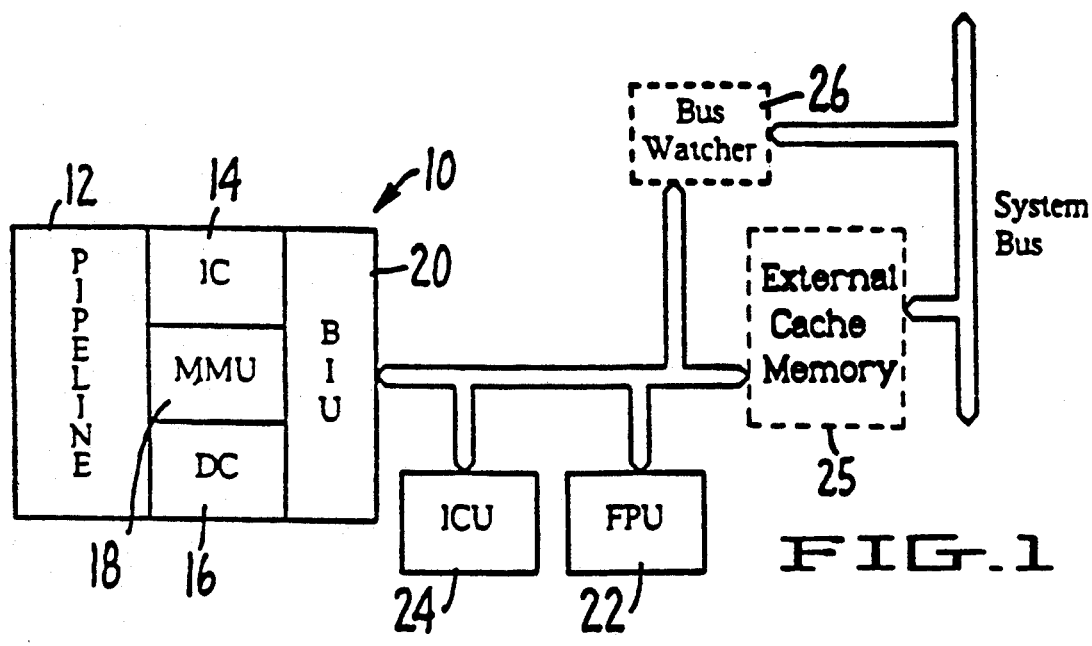
FIG. 1 is a schematic block diagram illustrating the general architecture of a microprocessor which utilizes the control flow monitoring method of the present invention.

FIG. 1 shows the general architecture of a microprocessor (CPU) 10 which implements a control flow monitoring method in accordance with the present invention.

CPU 10 initiates bus cycles to communicate with external memory and with other devices in the computing cluster to fetch instructions, read and write data, perform floating-point operations and respond to exception requests.

CPU 10 includes a 4-stage instruction Pipeline 12 that is capable of executing, at 20 MHz, up to 10 MIPS (millions of instructions per second). Also integrated on-chip with instruction Pipeline 12 are three storage buffers that sustain the heavy demand of Pipeline 12 for instructions and data. The storage buffers include a 512-byte Instruction Cache 14, a 1024-byte Data Cache 16 and a 64-entry translation buffer which is included within an on-chip memory management unit (MMU) 18. The primary functions of MMU 18 are to arbitrate requests for memory references and to translate virtual addresses to physical addresses. CPU 10 also includes an integrated Bus Interface Unit (BIU) 20 which controls the bus cycles for external references.

Placing the cache and memory management functions on the same chip with instruction Pipeline 12 provides excellent cost/performance by improving memory access time and bandwidth for all microprocessor applications.

CPU 10 is also compatible with available peripheral devices, such as Interrupt Control Unit (ICU) 24 (e.g., NS32202). The ICU interface to CPU 10 is completely asynchronous, so it is possible to operate ICU 24 at lower frequencies than CPU 10.

CPU 10 incorporates its own clock generator. Therefore, no timing control unit is required.

CPU 10 supports both external cache memory 25 as well as a "Bus Watcher" circuit 26 which assists in maintaining internal cache coherence, as described below.

Figure 2:
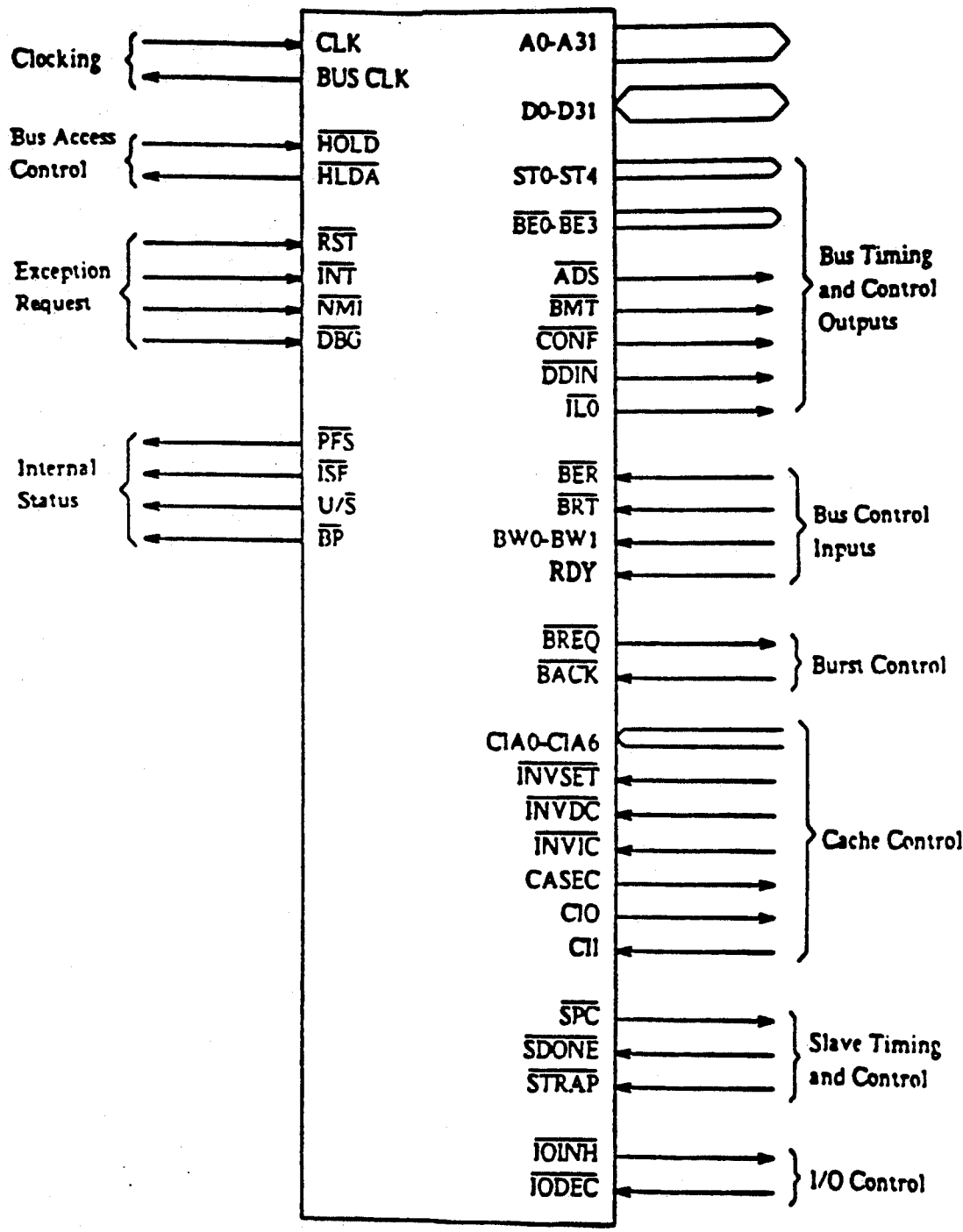
FIG. 2 is a schematic diagram illustrating the interface signals of the microprocessor described herein.

As shown in FIG. 2, CPU 10 has 114 interface signals for bus timing and control, cache control, exception requests and other functions. The following list provides a summary of the CPU 10 interface signal functions:

Input Signals

| | |
|---|---|
| BACK | Burst Acknowledge (Active Low). When active in response to a burst request, indicates that the memory supports burst cycles. |
| BER | Bus Error (Active Low). Indicates to CPU 10 that an error was detected during the current bus cycle. |
| BRT | Bus Retry (Active Low). Indicates that CPU 10 must perform the current bus cycle again. |
| BW0-BW1 | Bus Width (2 encoded lines). These lines define the bus width (8, 16 or 32 bits) for each data transfer, as shown in Table 1 below. |

TABLE 1

| BW1 | BW0 | Bus Width |
|---|---|---|
| 0 | 0 | reserved |
| 0 | 1 | 8 bits |
| 1 | 0 | 16 bits |
| 1 | 1 | 32 bits |

| | |
|---|---|
| CIA0-CIA6 | Cache Invalidation Address (7 encoded lines) The cache invalidation address is presented on the CIA bus. Table 2 presents the CIA lines relevant for each of the internal caches of CPU 10. |

TABLE 2

| CIA (0:4) | Set address in DC and IC |
|---|---|
| CIA (5:6) | Reserved |

TABLE 2

| | |
|---|---|
| CII | Cache Inhibit In (Active High). Indicates to CPU 10 that the memory reference of the current bus cycle is not cacheable. |
| CINVE | Cache Invalidation Enable. Input which determines whether the External Cache Invalidation options or the Test Mode operation have been selected. |
| CLK | Clock. Input clock used to derive all timing for CPU 10. |
| DBG | Debug Trap Request (Falling-Edge Activated). High-to-low transition of this signal causes Trap (DBG). |
| HOLD | Hold Request (Active Low). Requests CPU 10 to release the bus for direct memory access unit (DMA) or multiprocessor purposes. |
| INT | Interrupt (Active Low). Maskable interrupt request. |

TABLE 2-continued

| | |
|---|---|
| INVSET | Invalidate Set (Active Low). When Low, only a set in the on-chip caches is invalidated; when High, the entire cache is invalidated. |
| INVDC | Invalidate Data Cache (Active Low). When low, an invalidation is done in the Data Cache. |
| INVIC | Invalidate Instruction Cache (Active Low). When low, an invalidation is done in the Instruction Cache. |
| IODEC | I/O Decode (Active Low). Indicates to CPU 10 that a peripheral device is addressed by the current bus cycle. |
| NMI | Nonmaskable Interrupt (Falling-Edge Activated). A High-to-Low transition of this signal requests a nonmaskable interrupt. |
| RDY | Ready (Active High). While this signal is not active, CPU 10 extends the current bus cycle to support a slow memory or peripheral device. |
| RST | Reset (Active Low). Generates reset exceptions to initialize CPU 10. |
| SDONE | Slave Done (Active Low). Indicates to CPU 10 that a Slave Processor has completed executing an instruction. |
| STRAP | Slave Trap (Active Low). Indicates to CPU 10 that a Slave Processor has detected a trap condition while executing an instruction. |

Output Signals

| | |
|---|---|
| A0-A31 | Address Bus (3-state, 32 lines) Transfers the 32-bit address during a bus cycle. A0 transfers the least significant bit. |
| ADS | Address Strobe (Active Low, 3-State). Indicates that a bus cycle has begun and a valid address is on the address bus. |
| BE0-BE3 | Byte Enables (Active Low, 3-state, 4 lines). Signals enabling transfer on each byte of the data bus, as shown in Table 3. |

TABLE 3

| BE | Enables Bits |
|---|---|
| 0 | 0-7 |
| 1 | 8-15 |
| 2 | 16-23 |
| 3 | 24-31 |

TABLE 3

| | |
|---|---|
| BMT | Begin Memory Transaction (Active Low, 3-State). Indicates that the current bus cycle is valid, that is, the bus cycle has not been cancelled; available earlier in the bus cycle than CONF. |

TABLE 3-continued

| | |
|---|---|
| BP̄ | Break Point (Active Low). Indicates that CPU 10 has detected a debug condition. |
| BREQ̄ | Burst Request (Active Low, 3-state). Indicates that the CPU 10 is requesting to perform burst cycles. |
| BUSCLK | Bus Clock Output clock for bus timing. |
| CASEC | Cache Section (3-state) For cacheable data read bus cycles, indicates the section of the on-chip Data Cache 18 into which the data will be placed. |
| CIO | Cache Inhibit (Active High). Indication by CPU 10 that the memory reference of the current bus cycle is not cacheable; controlled by the CI-bit in the level-2 Page Table Entry. |
| CONF̄ | Confirm Bus Cycle (Active Low, 3-state). Indicates that a bus cycle initiated with ADS̄ is valid; that is, the bus cycle has not been cancelled. |
| DDIN̄ | Data Direction In (Active Low, 3-state). Indicates the direction of transfers on the data bus; when Low during a bus cycle, indicates that CPU 10 is reading data; when High during a bus cycle, indicates that CPU 10 is writing data. |
| HLDA | Hold Acknowledge (Active Low). Activated by CPU 10 in response to the 1-HOLD input to indicate that CPU 10 has released the bus. |
| ILO | Interlocked Bus Cycle (Active Low). Indicates that a sequence of bus cycles with interlock protection is in progress. |
| IOINH̄ | I/O Inhibit (Active Low). Indicates that the current bus cycle should be ignored if a peripheral device is addressed. |
| ISF̄ | Internal Sequential Fetch. Indicates, along with PFS̄, that the instruction beginning execution is sequential (ISF̄ = Low) or non-sequential (ISF̄ = High). |
| PFS̄ | Program Flow Status (Active Low). A pulse on this signal indicates the beginning of execution for each instruction. |
| SPC̄ | Slave Processor Control (Active Low). Data Strobe for Slave Processor bus cycles. |
| ST0-ST4 | Status (5 encoded lines). Bus cycle status code; ST0 is the least significant bit. The encoding is shown in Table 4. |
| U/S̄ | User/Supervisor (3-state). Indicates User (U/S̄ = High) or Supervisor (U/S̄ = Low) Mode. |
| Bidirectional Signals | |
| D0-D31 | Data Bus (3-state, 32 lines). Transfers 8, 16, or 32 bits of data during a bus cycle. D0 transfers the least significant bit. |

TABLE 4

| \multicolumn{5}{c}{STATUS} | |
|---|---|---|---|---|---|
| 4 | 3 | 2 | 1 | 0 | DESCRIPTION |
| 0 | 0 | 0 | 0 | 0 | Idle |
| 0 | 0 | 0 | 0 | 1 | Idle: Wait Instruction |
| 0 | 0 | 0 | 1 | 0 | Idle: Halted |
| 0 | 0 | 0 | 1 | 1 | Idle: Waiting for Slave |
| 0 | 0 | 1 | 0 | 0 | Interrupt acknowledge, Master |
| 0 | 0 | 1 | 0 | 1 | Interrupt acknowledge, Cascaded |
| 0 | 0 | 1 | 1 | 0 | End of Interrupt, Master |
| 0 | 0 | 1 | 1 | 1 | End of Interrupt, Cascaded |
| 0 | 1 | 0 | 0 | 0 | Sequential Instruction Fetch |
| 0 | 1 | 0 | 0 | 1 | Non-sequential Instruction Fetch |
| 0 | 1 | 0 | 1 | 0 | Data transfer |
| 0 | 1 | 0 | 1 | 1 | Read Read-Modify-Write Operand |
| 0 | 1 | 1 | 0 | 0 | Read for Effective address |
| 0 | 1 | 1 | 0 | 1 | Access PTE1 by MMU |
| 0 | 1 | 1 | 1 | 0 | Access PTE2 by MMU |
| 0 | 1 | 1 | 1 | 1 | reserved |
| 1 | 0 | 0 | 0 | 0 | reserved |
| 1 | 0 | 0 | 0 | 1 | reserved |
| 1 | 0 | 0 | 1 | 0 | reserved |
| 1 | 0 | 0 | 1 | 1 | reserved |
| 1 | 0 | 1 | 0 | 0 | reserved |
| 1 | 0 | 1 | 0 | 1 | reserved |
| 1 | 0 | 1 | 1 | 0 | reserved |
| 1 | 0 | 1 | 1 | 1 | reserved |
| 1 | 1 | 0 | 0 | 0 | reserved |
| 1 | 1 | 0 | 0 | 1 | reserved |
| 1 | 1 | 0 | 1 | 0 | reserved |
| 1 | 1 | 0 | 1 | 1 | reserved |
| 1 | 1 | 1 | 0 | 0 | reserved |
| 1 | 1 | 1 | 0 | 1 | Transfer Slave Processor Operand |
| 1 | 1 | 1 | 1 | 0 | Read Slave Processor Status |
| 1 | 1 | 1 | 1 | 1 | Broadcast Slave ID + Opcode |

Figure 3:
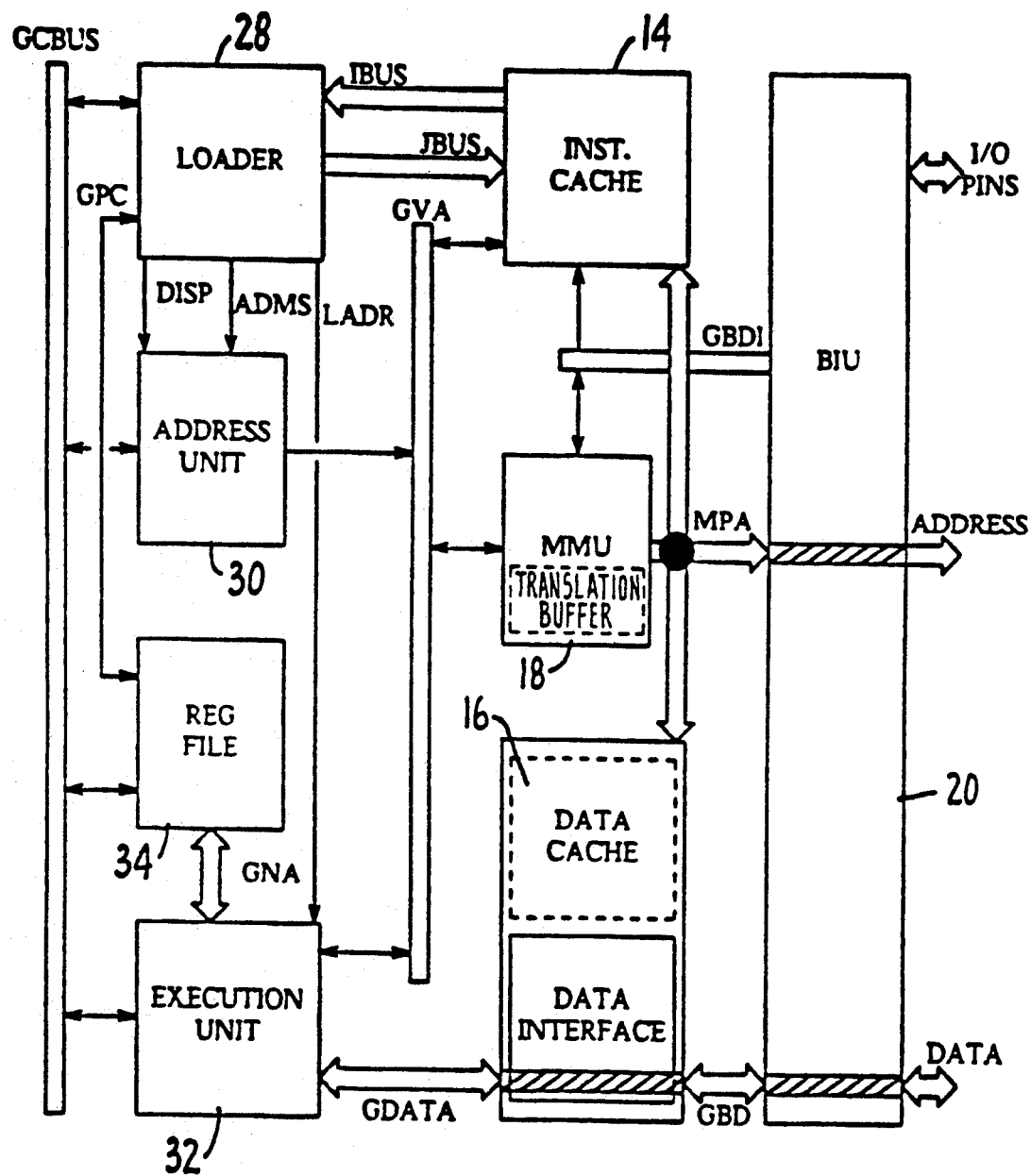
FIG. 3 is a schematic block diagram illustrating the major functional units and interconnecting buses of the microprocessor described herein.

Referring to FIG. 3, CPU 10 is organized internally as eight major functional units that operate in parallel to perform the following operations to execute instructions: prefetch, decode, calculate effective addresses and read source operands, calculate results and store to registers, store results to memory.

A Loader 28 prefetches instructions and decodes them for use by an Address Unit 30 and an Execution Unit 32. Loader 28 transfers instructions received from the Instruction Cache 14 on the IBUS bus into an 8-byte instruction queue. Loader 28 can extract an instruction field on each cycle, where a "field" means either an opcode (1 to 3 bytes including addressing mode specifiers), displacement or immediate value. Loader 28 decodes the opcode to generate the initial microcode address, which is passed on the LADR bus to Execution Unit 32. The decoded general addressing modes are passed on the ADMS bus to Address Unit 30. Displacement values are passed to Address Unit 30 on the DISP bus. Immediate values are available on the GCBUS bus. Loader 28 also includes a branch-prediction mechanism, which is described below.

Address Unit 30 calculates effective addresses using a dedicated 32-bit adder and reads source operands for Execution Unit 32. Address Unit 30 controls a port from a Register File 34 to the GCBUS through which it transfers base and index values to the address adder and data values to Execution Unit 32. Effective addresses for operand references are transferred to MMU 18 and Data Cache 16 on the GVA bus, which is the virtual address bus.

Execution Unit 32 includes the data path and the microcoded control for executing instructions and processing exceptions. The data path includes a 32-bit Arithmetic Logic Unit (ALU), a 32-bit barrel shifter, an 8-bit priority encoder, and a number of counters. Special-purpose hardware incorporated in Execution Unit 32 supports multiplication, retiring one bit per cycle with optimization for multipliers of small absolute value.

Execution Unit 32 controls a port to Register File 34 from the GNA bus on which it stores results. The GNA bus is also used by Execution Unit 32 to read values of a number of dedicated registers, like configuration and interrupt base registers, which are included in Register File 34. A 2-entry data buffer allows Execution Unit 32 to overlap the execution of one instruction with storing results to memory for previous instructions. The GVA bus is used by Execution Unit 32 to perform memory references for complex instructions (e.g., string operations) and exception processing.

Register File 34 is dual-ported, allowing read access by Address Unit 30 on the GCBUS and read/write access by Execution Unit 32 on the GNA bus. Register File 34 holds the general-purpose registers, dedicated registers, and program counter values for Address Unit 30 and Execution Unit 32.

MMU 18 is compatible with the memory management functions of CPU 10. Instruction Cache 14, Address Unit 30 and Execution Unit 32 make requests to MMU 20 for memory references. MMU 18 arbitrates the requests, granting access to transfer a virtual address on the GVA bus. MMU 18 translates the virtual address it receives on the GVA bus to the corresponding physical address, using its internal 64-entry Translation Buffer. MMU 18 transfers the physical address on the MPA bus to either Instruction Cache 14 or Data Cache 16, depending on whether an instruction or data reference is being performed. The physical address is also transferred to BIU 20 for an external bus cycle.

Bus Interface Unit (BIU) 20 controls the bus cycles for references by Instruction Cache 14, Address Unit 30 and Execution Unit 32. BIU 20 contains a 3-entry buffer for external references. Thus, for example, BIU 20 can be performing a bus cycle for an instruction fetch while holding the information for another bus cycle to write to memory and simultaneously accepting the next data read.

Figure 4:
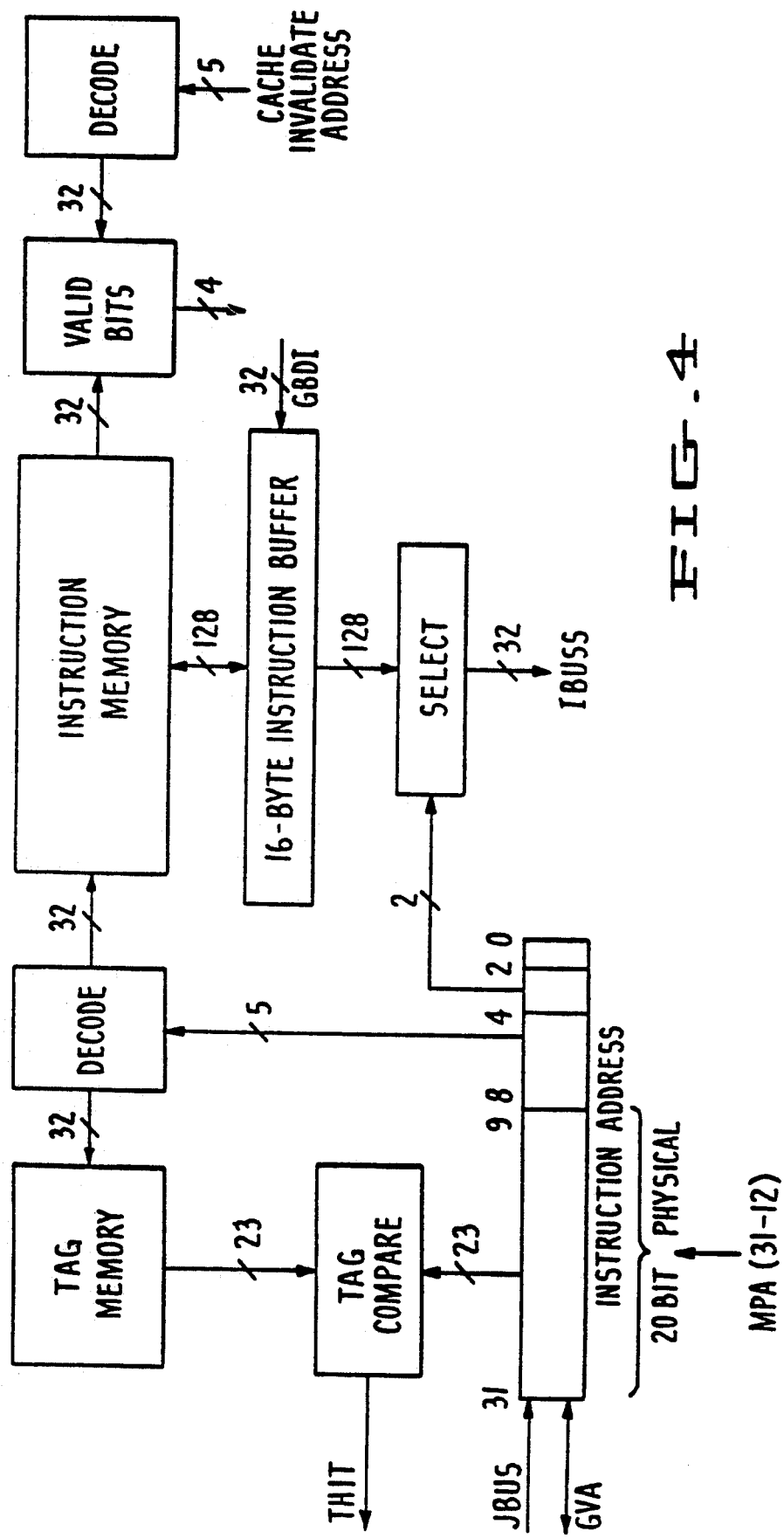
FIG. 4 is a schematic block diagram illustrating the structure of the Instruction Cache of the microprocessor described herein.

Referring to FIG. 4, Instruction Cache 14 stores 512 bytes in a direct-map organization. Bits 6 through 8 of a reference instruction's address select 1 of 8 sets. Each set contains 16 bytes, i.e. 4-double-words of code and a log that holds address tags comprising the 23 most-significant bits of the physical address for the locations stored in that set. A valid bit is associated with every double-word.

Instruction Cache 14 also includes a 16-byte instruction buffer from which it can transfer 32-bits of code per cycle on the IBUS to Loader 28. In the event that the desired instruction is found in Instruction Cache 14 (a "hit"), the instruction buffer is loaded from the selected set of Instruction Cache 14. In the event of a miss, Instruction Cache 14 transfers the address of the missing double-word on the GVA bus to MMU 18, which translates the address for BIU 20. BIU 20 initiates a burst read cycle to load the instruction buffer from external memory through the GBDI bus. The instruction buffer is then written to one of the sets of Instruction Cache 14.

Instruction Cache 14 holds counters for both the virtual and physical addresses from which to prefetch the next double-word of the instruction stream. When Instruction Cache 14 must begin prefetching from a new instruction stream, the virtual address for the new stream is transferred from Loader 28 on the JBUS. When crossing to a new page, Instruction Cache 14 transfers the virtual address to MMU 18 on the GVA bus and receives back the physical address on the MPA bus.

Instruction Cache 14 supports an operating mode to lock its contents to fixed locations. This feature is enabled by setting a Lock Instruction Cache (LIC) bit in the configuration register. It can be used in real-time systems to allow fast, on-chip access to the most critical routines. Instruction Cache 14 can be enabled by setting an Instruction Cache Enable (IC) bit in the configuration register.

Figure 5:
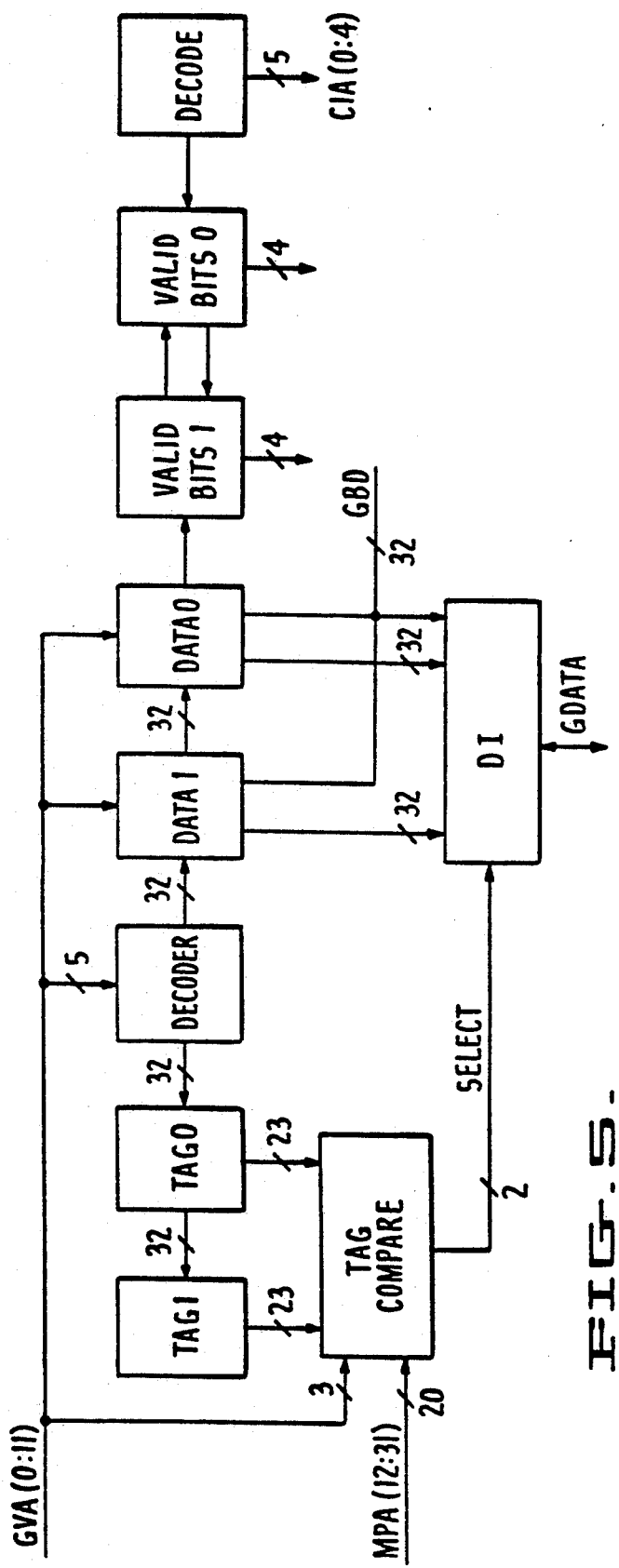
FIG. 5 is a schematic block diagram illustrating the structure of the Data Cache of the microprocessor described herein.

Data Cache 16 stores 1024 bytes of data in a two-way set associative organization, as shown in FIG. 5. Each set has two entries containing 16 bytes and two tags that hold the 23 most significant bits of physical address for the locations stored in the two entries. A valid bit is associated with every double-word.

Figure 6:
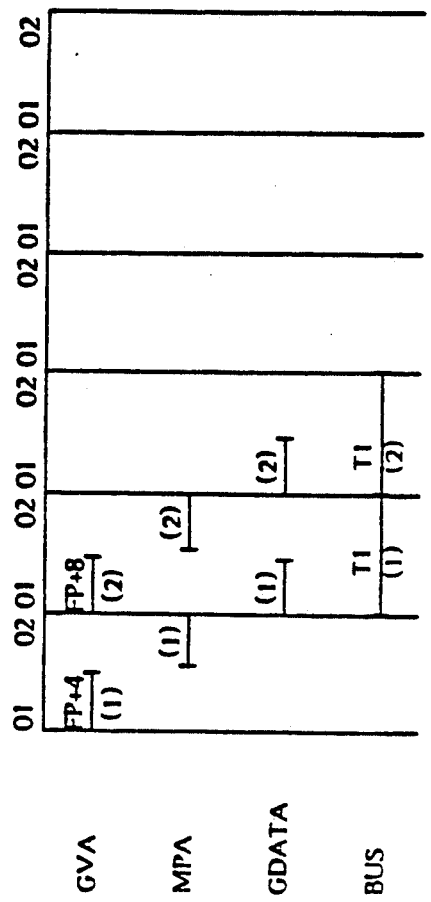
FIG. 6 is a timing diagram illustrating the timing sequence for access to the Data Cache of the microprocessor described herein.

The timing to access Data Cache 16 is shown in FIG. 6. First, virtual address bits 4 through 8 on the GVA bus are used to select the appropriate set within Data Cache 16 and read the two entries. Simultaneously, MMU 18 is translating the virtual address and transferring the physical address to Data Cache 16 and BIU 20 on the MPA bus. Then Data Cache 16 compares the two address tags with the physical address while BIU 20 initiates an external bus cycle to read the data from external memory. If the reference is a hit, then the selected data is aligned by Data Cache 16 and transferred to Execution Unit 32 on the GDATA bus and BIU 20 cancels the external bus cycle but does not assert the BMT and $\overline{\text{CONF}}$ signals. If the reference is a miss, BIU 20 completes the external bus cycle and transfers data from external memory to Execution Unit 32 and Data Cache 16, which updates its cache entry. For references that hit, Data Cache 16 can sustain a throughput of one double-word per cycle, with a latency of 1.5 cycles.

Data Cache 16 is a write-through cache. For memory write references, Data Cache 16 examines whether the reference is a hit. If so, the contents of the cache are updated. In the event of either a hit or a miss, BIU 20 writes the data through to external memory.

Like Instruction Cache 14, Data Cache 16 supports an operating mode to lock its contents to fixed locations. This feature is enabled by setting a Lock Data Cache (LDC) bit in the configuration register. It can be used in real-time systems to allow fast on-chip access to the most critical data locations. Data Cache 16 can be enabled by setting a Data Cache Enable (DC) bit in the configuration register.

CPU 10 receives a single-phase input clock CLK which has a frequency twice that of the operating rate of CPU 10. For example, the input clock's frequency is 40 MHz for a CPU 10 operating at 20 MHz. CPU 10 divides the CLK input by two to obtain an internal clock that is composed of two non-overlapping phases, PHI1 and PHI2. CPU 10 drives PHI1 on the BUSCLK output signal.

Figure 7:
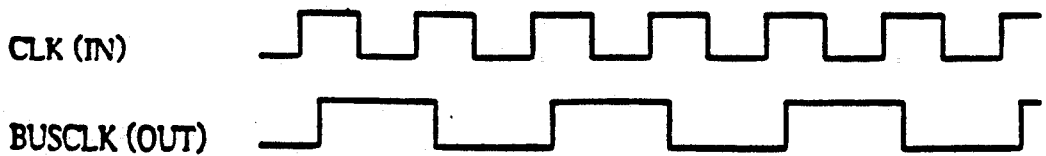
FIG. 7 is a timing diagram illustrating the relationship between the CLK input and BUSCLK output signals of the microprocessor described herein.

FIG. 7 shows the relationship between the CLK input and BUSCLK output signals.

Figure 8:
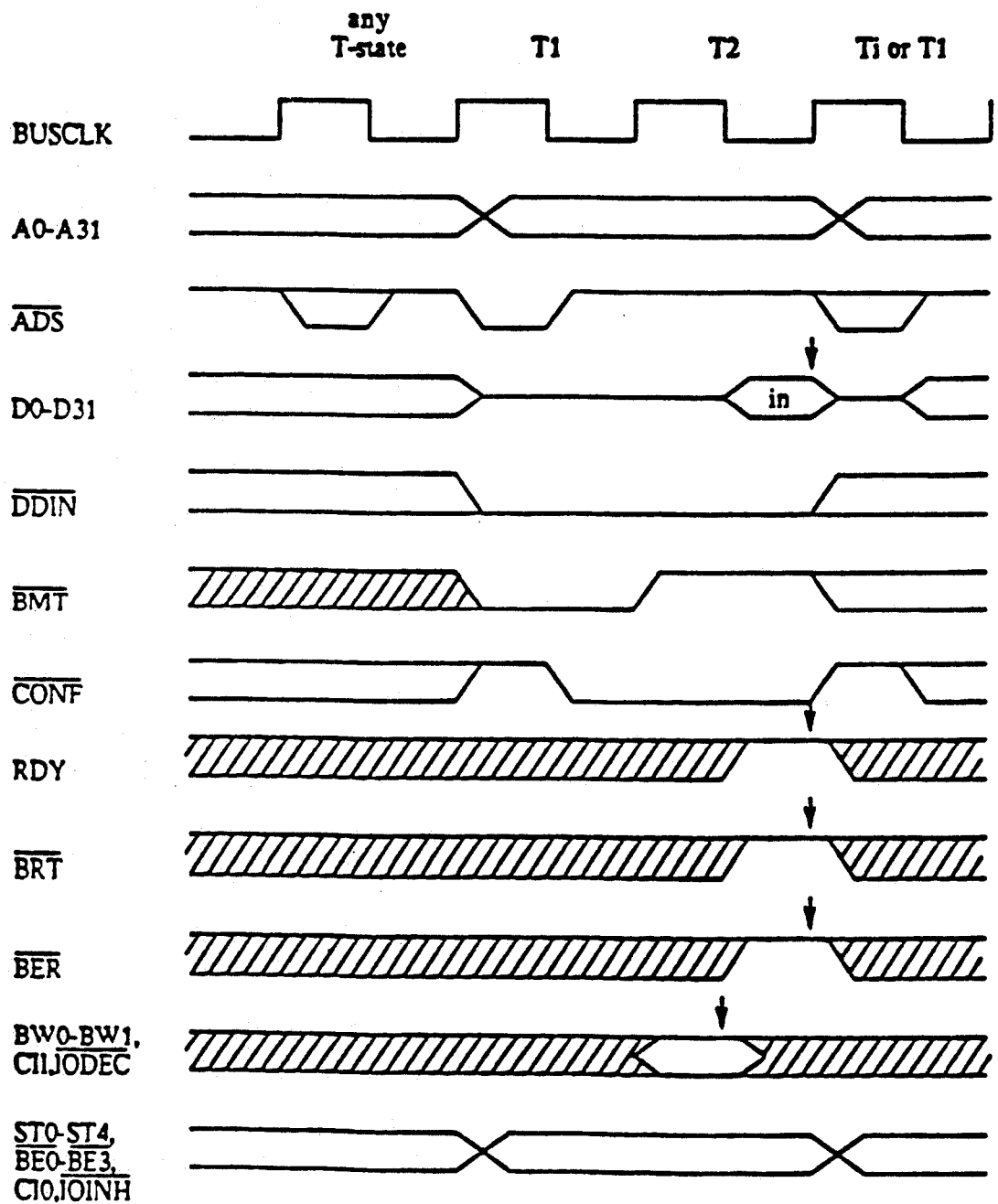
FIG. 8 is a timing diagram illustrating the basic read cycle of the microprocessor described herein.

As illustrated in FIG. 8, every rising edge of the BUSCLK output defines a transition in the timing state ("T-state") of CPU 10. Bus cycles occur during a sequence of T-states, labelled T1, T2, and T2B in the associated timing diagrams. There may be idle T-states (Ti) between bus cycles. The phase relationship of the BUSCLK output to the CLK input can be established at reset.

The basic bus cycles performed by CPU 10 to read from and write to external memory and peripheral devices occur during two cycles of the bus clock, called T1 and T2. The basic bus cycles can be extended beyond two clock cycles for two reasons. First, additional T2 cycles can be added to wait for slow memory and peripheral devices. Second, when reading from external memory, burst cycles (called "T2B") can be used to transfer multiple double-words from consecutive locations.

Figure 9:
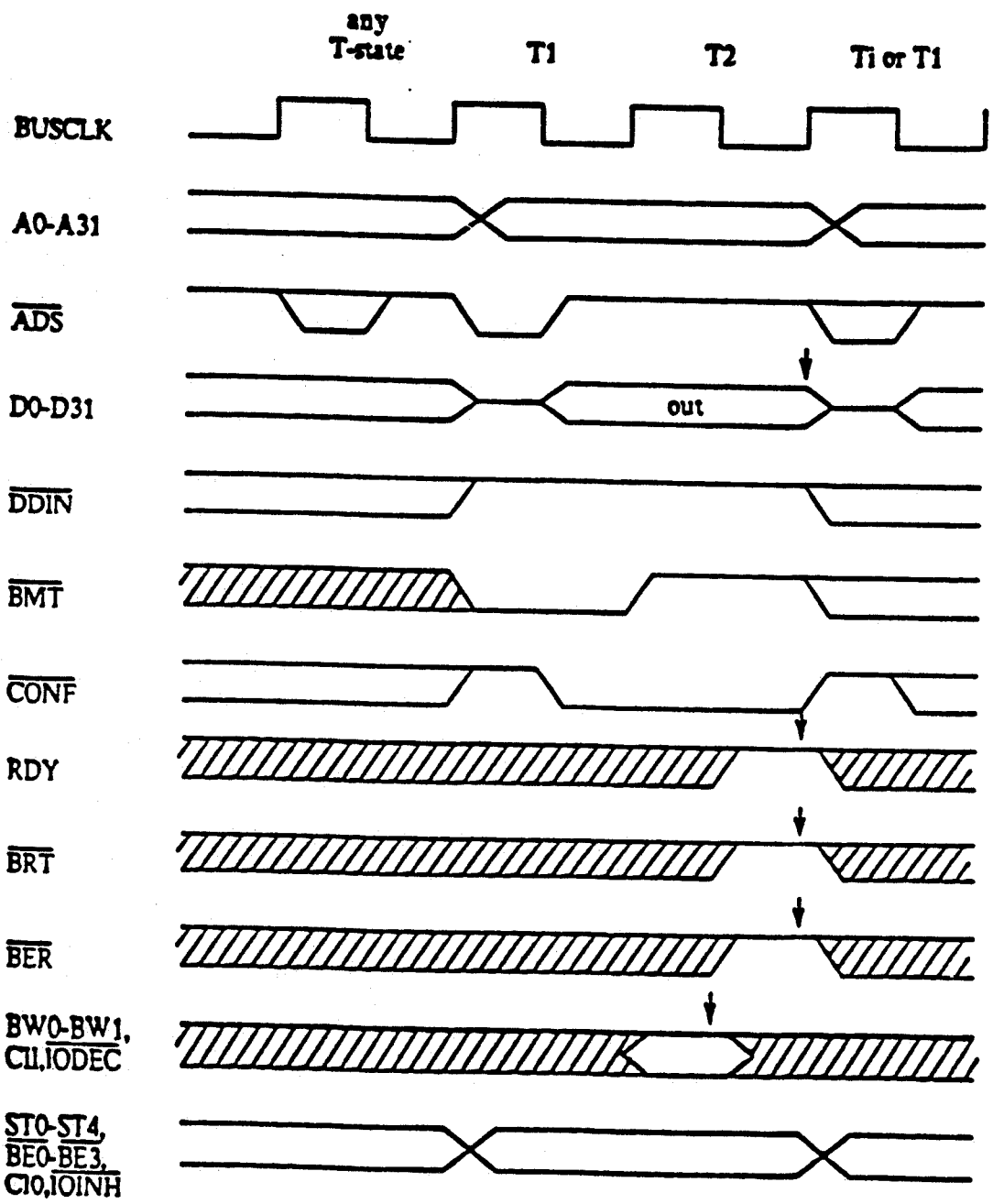
FIG. 9 is a timing diagram illustrating the basic write cycle of the microprocessor described herein.

The timing for basic read and write bus cycles with no "wait" states is shown in FIGS. 8 and 9, respectively. For both read and write bus cycles, CPU 10 asserts Address Strobe $\overline{\text{ADS}}$ during the first half of T1 indicating the beginning of the bus cycle. From the beginning of T1 until the completion of the bus cycle, CPU 10 drives the address bus and control signals for the Status (ST0-ST4), Byte Enables (BE0-BE3), Data Direction In ($\overline{\text{DDIN}}$), Cache Inhibit (CIO), I/O Inhibit ($\overline{\text{IOINH}}$), and Cache Section (CASEC) signals.

If the bus cycle is not cancelled (that is, T2 will follow on the next clock), CPU 10 asserts Begin Memory Transaction $\overline{\text{BMT}}$ during T1 and asserts Confirm Bus Cycle $\overline{\text{CONF}}$ from the middle of T1 until the completion of the bus cycle, at which time $\overline{\text{CONF}}$ is negated.

At the end of T2, CPU 10 samples that RDY is active, indicating that the bus cycle has been completed; that is, no additional T2 states should be added. Following T2 is either T1 for the next bus cycle or Ti, if CPU 10 has no bus cycles to perform.

Figure 10:
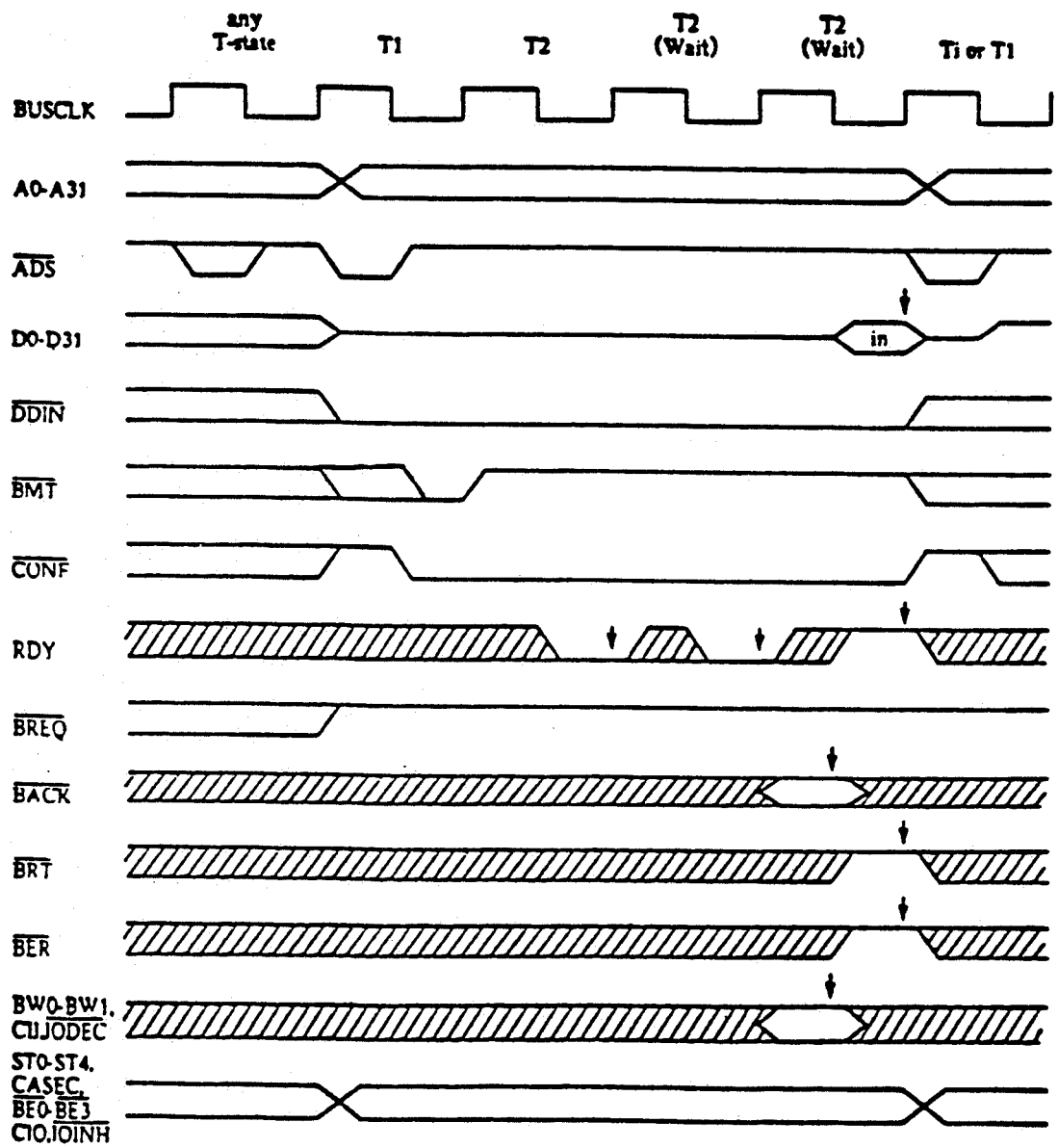
FIG. 10 is a timing diagram illustrating a read cycle of the microprocessor described herein which has been extended with two wait cycles.

As shown in FIG. 10, the basic read and write bus cycles previously described can be extended to support longer access times. As stated, CPU 10 samples RDY at the end of each T2 state. If RDY is inactive, then the bus cycle is extended by repeating T2 for another clock. The additional T2 states after the first are called "wait" states. FIG. 10 shows the extension of a read bus cycle with the addition of two wait states.

Figure 11:
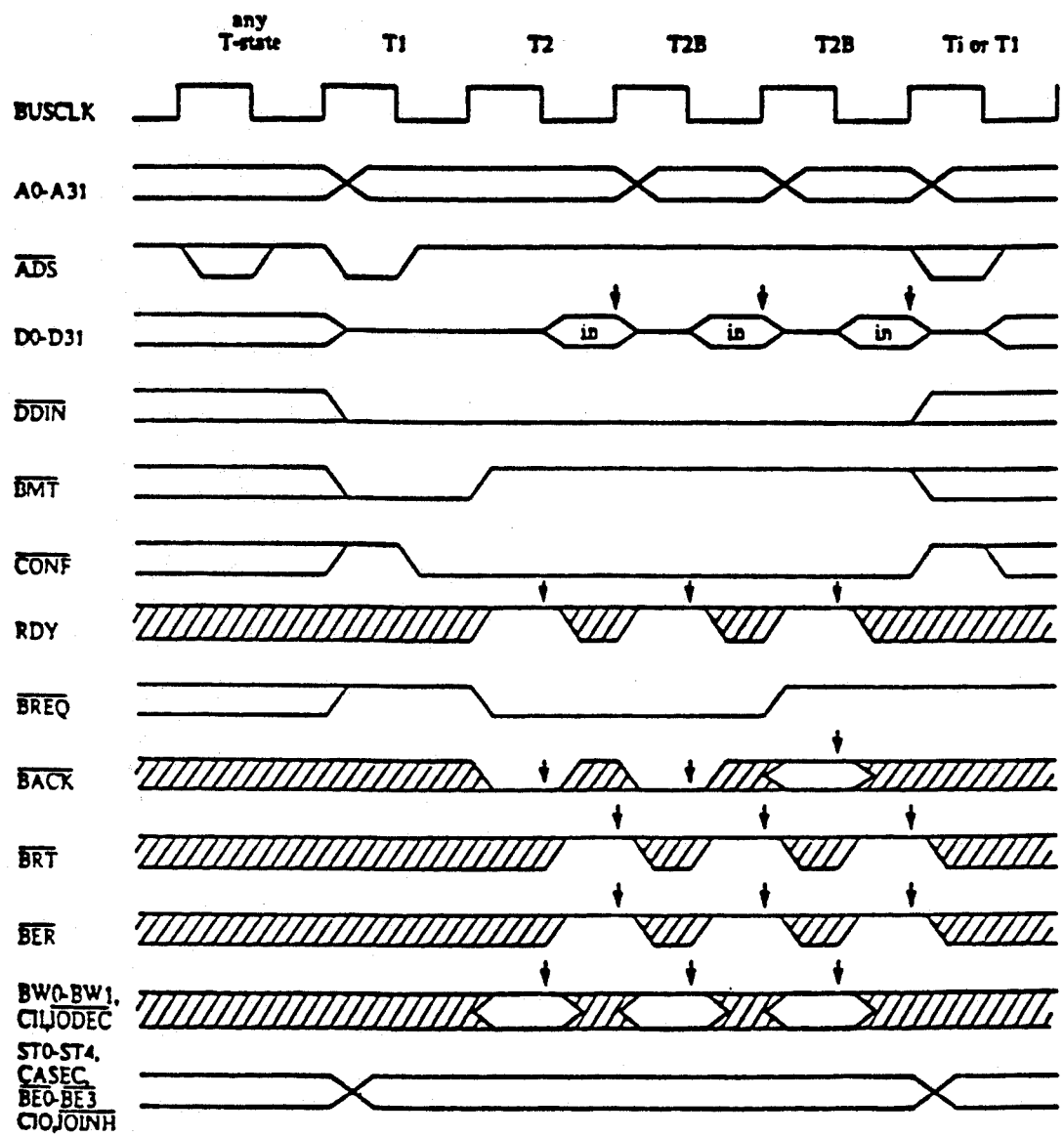
FIG. 11 is a timing diagram illustrating a burst read cycle, having three transfers, which is terminated by the microprocessor described herein.

As shown in FIG. 11, the basic read cycles can also be extended to support burst transfers of up to four double-words from consecutive memory locations. During a burst read cycle, the initial double-word is transferred during a sequence of T1 and T2 states, like a basic read cycle. Subsequent double-words are transferred during states called "T2B". Burst cycles are used only to read from 32-bit wide memories.

Figure 12:
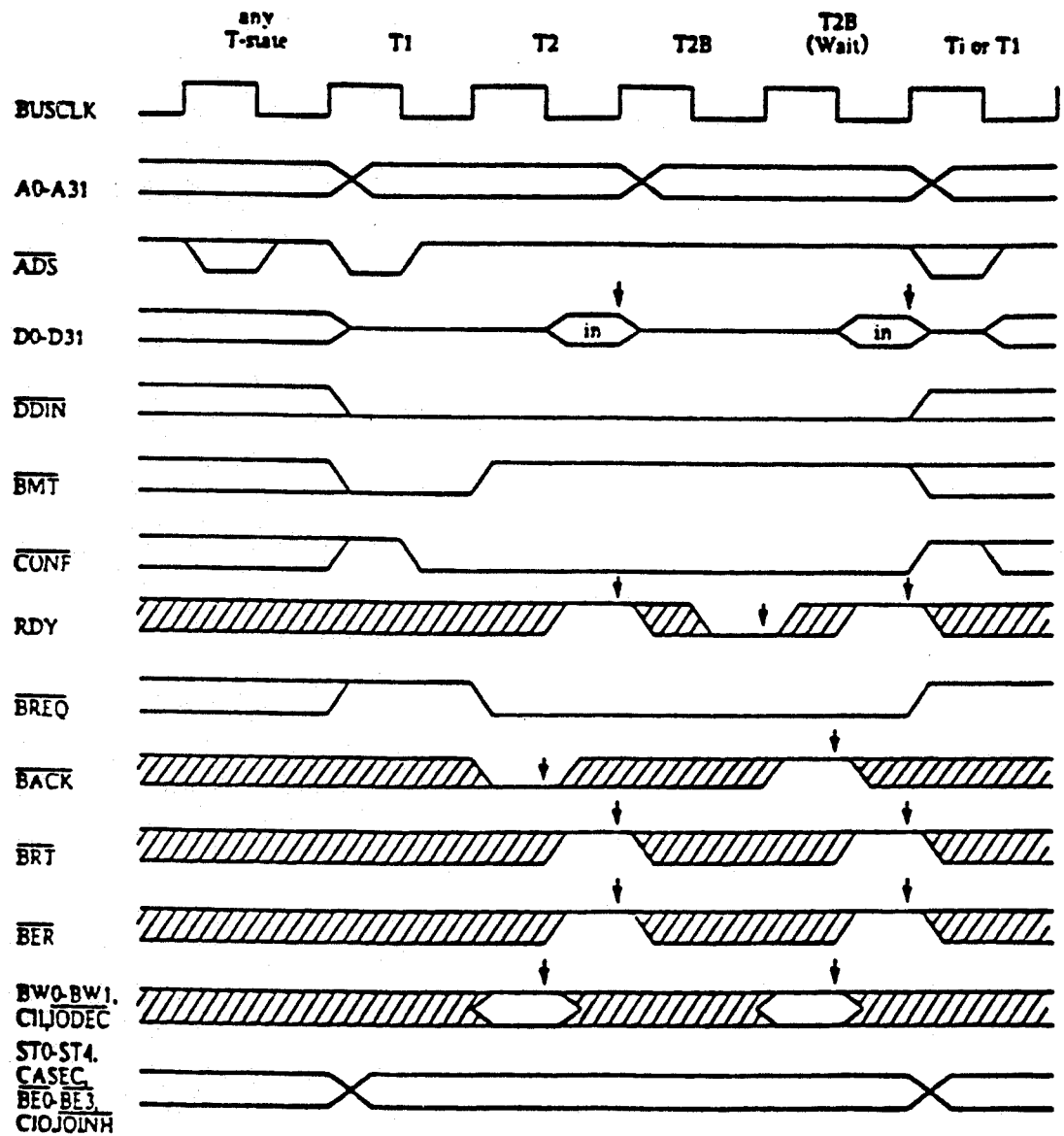
FIG. 12 is a timing diagram illustrating a burst read cycle terminated by the system, the burst cycle having two transfers, the second transfer being extended by one wait state.

The number of transfers in a burst read cycle is controlled by a handshake between the output signal Burst Request $\overline{\text{BREQ}}$ and the input signal Burst Acknowledge $\overline{\text{BACK}}$ during a T2 or T2B state to indicate that it requests another transfer following a current one. The memory asserts $\overline{\text{BACK}}$ to indicate that it can support another transfer. FIG. 11 shows a burst read cycle of three transfers in which CPU 10 terminates the sequence by negating $\overline{\text{BREQ}}$ after the second transfer. FIG. 12 shows a burst cycle of two transfers terminated by the system when $\overline{\text{BACK}}$ was inactive during the second transfer.

For each transfer after the first in the burst sequence, CPU 10 increments address bits 2 and 3 to select the next double-word. As shown for the second transfer in FIG. 12, CPU 10 samples RDY at the end of each state T2B and extends the access time for the burst transfer if RDY is inactive.

CPU 10 provides a number of techniques for maintaining data coherence between the two on-chip caches and external memory. These techniques are summarized in Table 5.

TABLE 5

| | SOFTWARE | HARDWARE |
|---|---|---|
| Inhibit Cache Access for certain locations | Cache-Inhibit bit in PTE | Cache-Inhibit input signal |
| Invalidate certain locations in Cache | CINV Instruction to invalidate block | Cache Invalidation request to invalidate set |
| Invalidate Entire Cache | CINV Instruction | Cache Invalidation request |

The use of the caches can be inhibited for individual pages using the CI bit in level-2 page table entries.

The coherence between the two on-chip caches of CPU 10 and external memory may be ensured by using an external "Bus Watcher" 26, shown in FIG. 1. This circuit 26 interfaces to the following buses:

1. CPU 10 address bus and CASEC output, to obtain information on which internal cache entries (tags) are modified and to maintain updated copies of CPU 10 internal cache tags;

2. The System Bus, to detect which internal memory addresses are modified; and

3. CPU 10 Cache Invalidation bus, consisting of $\overline{\text{INV SET}}$, $\overline{\text{INVDC}}$, $\overline{\text{INVIC}}$ and CIA0-CIA6 signals.

Bus Watcher 26 maintains tag copies of Instruction Cache 14 and Data Cache 16 entries. If the address of a memory write cycle on the System bus matches one of the tags inside Bus Watcher 26, a command will be issued by Bus Watcher 26 to CPU 10, via the Cache Invalidation Bus, to invalidate the corresponding entry in the appropriate internal cache. The invalidation of the internal cache entry by CPU 10 takes one clock cycle only and does not interfere with the on-going CPU bus cycle. Data Cache 16 is invalidated 32 bytes at a time, while Instruction Cache 14 is invalidated 16 bytes at a time.

These techniques for maintaining coherence between the two integrated caches of CPU 10 and external memory are more fully described in copending and commonly-assigned U.S. patent application Ser. No. 006,015, "Method of maintaining Coherence Between a Microprocessor's Integrated Cache and External Memory", filed by Shacham et al. of even date herewith, and which is hereby incorporated by reference.

To execute an instruction, CPU 10 first fetches the instruction whose address is contained in the program counter and then performs the operations for that particular instruction. After executing the instruction, the program counter value is updated in one of two ways to contain the address of the next instruction to execute: either the current instruction explicitly loads the program counter (like JUMP) or the program counter is incremented by the length of the current instruction.

The sequence of instructions executed by a microprocessor is determined by repeatedly applying the following four rules:

1. If the microprocessor detects an exception, control is transferred to the first instruction of the appropriate service procedure for that type of exception. Depending on the definition of the microprocessor's operation, the address and memory of the exception service procedure either is fixed or is found in a table of addresses for such procedures;

2. If the microprocessor executes a taken branch instruction, then control is transferred to the instruction whose address in memory is calculated by adding the displacement value in the branch instruction to the address of the branch instruction;

4. If the microprocessor executes a taken jump instruction, then control is transferred to the instruction whose address in memory is calculated in a general manner according to the definition of that particular instruction; and 4. If the microprocessor executes an instruction and none of the above rules applies, then control is transferred to the instruction whose address in memory immediately follows that of the executed instruction.

CPU 10 has five operating states regarding the execution of instructions and the processing of exceptions: reset, executing instructions, processing an exception, waiting for an interrupt and halted.

While executing an instruction, if CPU 10 recognizes an exception, it saves the contents of appropriate registers, then begins executing an exception service procedure. Exceptions are conditions, events and errors that alter the sequence of instruction execution.

CPU 10 recognizes four types of exception: reset, bus errors, interrupts and traps. A reset exception occurs when $\overline{RST}$ signal is activated; $\overline{RST}$ is used to initialize CPU 10. A bus error exception occurs when the BER signal is activated in response to an instruction fetch or data transfer required by CPU 10 to execute an instruction. An interrupt occurs in response to an event signalled by activating the NMI or INT signals; interrupts are typically requested by peripheral devices that require the attention of CPU 10. A trap occurs when certain conditions, such as a divisor of 0, are detected by CPU 10 during execution of an instruction.

Whenever the $\overline{RST}$ signal is activated, CPU 10 enters the reset state. CPU 10 remains in the reset state until $\overline{RST}$ is driven inactive, at which time it enters the state of executing instructions. While CPU 10 is in the reset state, the contents of certain dedicated registers are initialized.

While in the state of executing instructions, CPU 10 continues to execute instructions until an exception is recognized or a "wait" instruction is executed. When an exception other than reset is recognized, CPU 10 enters the state of processing an exception. Following execution of the "wait" instruction, CPU 10 enters the state of waiting for an interrupt.

While in the state of processing an exception, CPU 10 is saving the contents of appropriate registers and reading the program counter and module linkage values to begin execution of the exception service procedure. For processing an interrupt, CPU 10 additionally reads one or two vector values from ICU 24. Following the successful completion of all data references required to process an exception, CPU 10 enters the state of executing instructions. If, however, a bus error or an abort is detected while CPU 10 is processing an exception, it enters the halted state.

In the state of waiting for an interrupt, CPU 10 is idle. A special status identifying this state is presented on the system interface. When an interrupt or an external debug condition is detected, CPU 10 enters the state of processing an exception.

CPU 10 enters the halted state when a bus error or abort is detected while CPU 10 is processing an exception, thereby preventing the transfer of control to an appropriate exception service procedure. A special status identifying this state is presented on the system interface.

CPU 10 performs the following operations to execute an instruction:
fetch the instruction;
read source operands, if any;
calculate results;
write result operands, if any;
modify flags, if necessary; and
update the program counter.

Under most circumstances, CPU 10 executes instructions by completing the operations listed above in strict sequence for one instruction and then beginning the sequence of operation for the next instruction. However, as stated above, exceptions can alter the sequence of operations to execute an instruction or to advance from one instruction to the next. Also, for enhanced performance, CPU 10 overlaps the operations for executing several instructions in a pipelined manner.

The following discussion explains the effects of exceptions in Pipeline 12 on instruction execution. In this discussion, reads of addresses from memory to calculate effective addresses for memory-relative and external addressing modes are considered like source operands, even if the effective address is being calculated for an operand with access class of write.

CPU 10 checks for exceptions at various points during the execution of an instruction. When an exception is recognized, the instruction being executed ends in one of four possible ways: it is completed, it is suspended, it is terminated or it is partially completed. Each of the four types of exception causes a particular ending.

When an exception is recognized after an instruction is completed, CPU 10 has performed all of the operations for that instruction and for all other instructions executed since the last exception occurred. Result operands have been written, flags have been modified, and the program counter value saved on the interrupt stack contains the address of the next instruction to execute. The exception service procedure can, at its conclusion, execute an appropriate return instruction and CPU 10 will begin executing the instruction following the completed instruction.

An instruction is suspended when one of several trapping conditions or a restartable bus error is detected during execution of the instruction. A suspended instruction has not been completed, but all other instructions executed since the last exception occurred have been completed. Result operands and flags due to be effected by the instruction may have been modified, but only modifications that allow the instruction to be executed again and completed can occur. For certain exceptions (e.g., bus errors and abort, undefined-instruction, and illegal-operation traps), CPU 10 clears the appropriate control flag in the program status register before saving the copy that is pushed on the Interrupt Stack. The program counter value saved on the Interrupt Stack contains the address of the suspended instruction.

For example, a RESTORE instruction pops up to eight general-purpose registers from the stack. If an invalid page table entry is detected on one of the references to the stack, then the instruction is suspended. The general-purpose registers due to be loaded by the instruction may have been modified, but the stack pointer still holds the same value it did when this instruction began.

To complete a suspended instruction, the exception service procedure takes either of two actions:

1. The service procedure can simulate the suspended instructions execution. After calculating and writing the instruction's results, flags in the program status register copy saved on the Interrupt Stack are modified and the program counter value saved on the Interrupt Stack is updated to point to the next instruction to execute. The service procedure then executes an appropriate return instruction and CPU 10 begins executing the instruction following the suspended instruction. This is the action taken when floating-point instructions are simulated by software in systems without a hardware floating-point unit.

2. Suspended instruction can be executed again after the service procedure has eliminated the trapping condition that caused the instruction to be suspended. The service procedure executes an appropriate return instruction at its conclusion; then CPU 10 begins executing the suspended instruction again.

Although CPU 10 allows a suspended instruction to be executed again and completed, CPU 10 may have read a source operand or the instruction from a memory-mapped peripheral port before the exception was recognized. In such a case, the characteristic of the peripheral device may prevent correct re-execution of the instruction.

An instruction being executed is terminated when reset or when a nonrestartable bus error occurs. Any result operands and flags due to be effected by the instruction are undefined as are the contents of the program counter. The result operands of other instructions executed since the last serializing operation may not have been written to memory. A terminated instruction cannot be completed.

When a restartable bus error, interrupt, abort, or debug condition is recognized during execution of a string instruction, the instruction is said to be partially completed. A partially completed instruction has not been completed, but all other instructions executed since the last exception have been completed. Result operands and flags due to be effected by the instruction may have been modified, but the value stored in the stream pointers and other general-purpose registers used during the instruction's execution allow the instruction to be executed again and completed.

The program counter value saved on the Interrupt Stack contains the address of the partially completed instruction. The exception service procedure can, at its conclusion, simply execute the appropriate return instruction and CPU 10 will resume executing the partially completed instruction.

Figure 13:
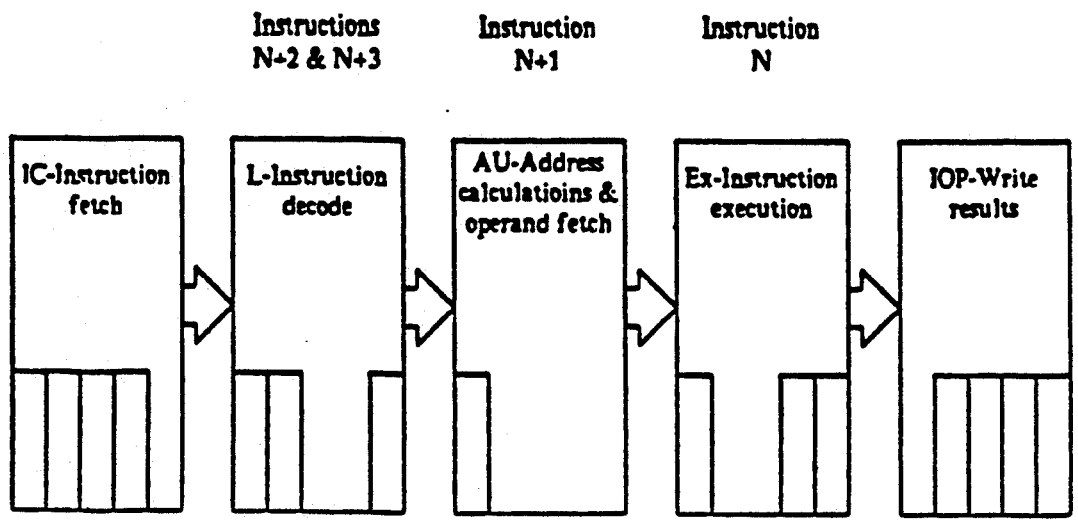
FIG. 13 is a schematic diagram illustrating the general structure of the 4-stage instruction Pipeline of the microprocessor described herein.

As stated above, CPU 10 overlaps the operations to execute several instructions simultaneously in 4-stage Pipeline 12. The general structure of Pipeline 12 is shown in FIG. 13. While Execution Unit 32 is calculating the results for one instruction, Address Unit 30 can be calculating the effective addresses and reading the source operands for the following instruction, and Loader 28 can be decoding a third instruction and prefetching a fourth instruction into its 8-byte queue. Under certain circumstances, the effects of overlapped instruction execution can differ from those of strictly sequential instruction execution. More specifically, the order of memory references performed by CPU 10 may appear to differ.

While executing an instruction, CPU 10 may read some of the source operands from memory before completely fetching the instruction. CPU 10, however, always completes fetching an instruction and reading its source operands before writing its results. When more than one source operand must be read from memory to execute an instruction, the operands may be read in any order. Similarly, when more than one result operand is written to memory to execute an instruction, the operands may be written in any order.

CPU 10 begins fetching an instruction only after all previous instructions have been completely fetched. However, CPU 10 may begin fetching an instruction before all the source operands have been read and results written for previous instructions.

CPU 10 begins reading the source operands for an instruction only after all previous instructions have been fetched and their source operands read. The source operand for an instructions may be read before all results of the previous instruction have been written, except when the source operands value depends on the result not yet written. CPU 10 compares the physical address in the length of the source operand with those of any results not yet written and delays reading the source operand until after writing all results on which the source operand depends.

In addition, CPU 10 identifies source operands that are located in memory-mapped peripheral ports and delays the reading of such operands until after all previous results destined for memory-mapped peripheral ports have been written. Special handling procedures insure that read and write references to memory-mapped I/O ports are always performed in the order implied by the program. These procedures are described in copending and commonly-assigned U.S. patent application Ser. No., 006,012, "Method of Detecting and Handling Memory-Mapped I/O by a Pipelined Microprocessor", filed by Levy et al. of even date herewith, and which is hereby incorporated by reference.

CPU 10 begins writing the result operands for an instruction only after all results of previous instructions have been written.

As a consequence of overlapping the operations for several instructions, CPU 10 may fetch an instruction and read its source operands, although the instruction is not executed (for example, if the previous instruction causes a trap). Nevertheless, when CPU 10 identifies that a source operand for an instruction is located in a memory-mapped peripheral port, then it will read the source operand only if the instruction is executed.

Note that CPU 10 does not check for dependencies between the fetching of an instruction and the writing of previous instructions results. Thus, self-modifying code must be treated specially to execute as intended.

After executing certain instructions or processing an exception, CPU 10 serializes instruction execution. Serializing instruction execution means that CPU 10 completes writing all previous instructions results to memory, then begins fetching and executing the next instruction. Thus, when a new value is loaded into the program status register, the new program status register value determines the privilege state used to fetch and execute the next instruction.

In accordance with the present invention, CPU 10 implements a two-step procedure for monitoring the sequence of executed instructions. First, an additional interface signal is provided which indicates whether an instruction beginning execution is sequential or non-sequential. Second, additional information is displayed on the interface signals used for external memory references.

The interface signal is called "Internal Sequential Fetch" (ISF). CPU 10 activates the ISF signal, along with a Program Flow Status (PFS) signal, whenever a taken branch or jump instruction is executed. For purposes of the present invention, it is only necessary for CPU 10 to activate the ISF signal for taken branch instructions. It is, therefore, possible to monitor control flow when a branch instruction is executed. If the branch instruction is taken, which is indicated by driving the ISF signal active, then control is transferred to a destination instruction, the address of which can be calculated knowing the encoding and address of the branch instruction. If the branch is not taken, which is indicated by driving the ISF signal inactive, then control is transferred to the instruction following the branch instruction in memory.

Additional information for monitoring control flow is displayed on the external memory interface only when a taken jump instruction is executed or an exception occurs. When an exception occurs, CPU 10 displays both a code that indicates the type of exception and the virtual address of the exception service procedure. When a taken jump instruction is executed, CPU 10 displays the virtual address of the jump destination. The destination address is displayed after CPU 10 has begun fetching the instruction at the jump destination. The memory interface will typically be idle at this time while CPU 10 is decoding and preparing to execute the instruction at the jump destination. CPU 10 indicates, through status information, when it is displaying either the code for an exception or the destination address for a taken jump instruction rather than making the reference to memory.

The Address Unit 30 and Execution Unit 32, can process instructions at a peak rate of two cycles per instruction. Loader 28 can process instructions at a peak rate of one cycle per instruction, so it will typically keep a steady supply of instructions to the Address Unit 30 and Execution Units 32. Loader 28 disrupts the throughput of Pipeline 12 only when a gap in the instruction stream arises due to a branch instruction or Instruction Cache miss.

Figure 14:
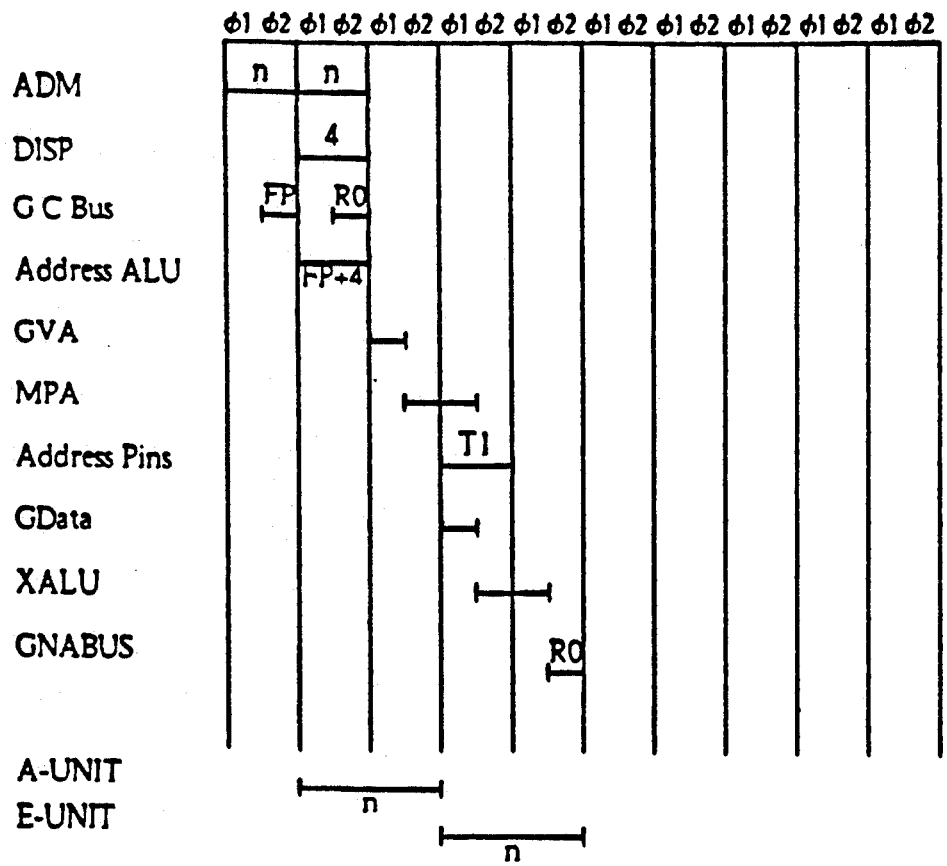
FIG. 14 is a timing diagram illustrating Pipeline timing for an internal Data Cache hit.

FIG. 14 shows the execution of two memory-to-register instructions by the Address Unit 30 and Execution Unit 32. CPU 10 can sustain an execution rate of two cycles for most common instruction, typically exhibiting delays only in the following cases:

1. Storage delays due to cache and translation buffer misses and non-aligned references.

2. Resource contention between stages of instruction Pipeline 12.

3. Branches and other non-sequential instruction fetches.

4. Complex addressing modes like scaled index, and complex operations, like division.

Figure 15:
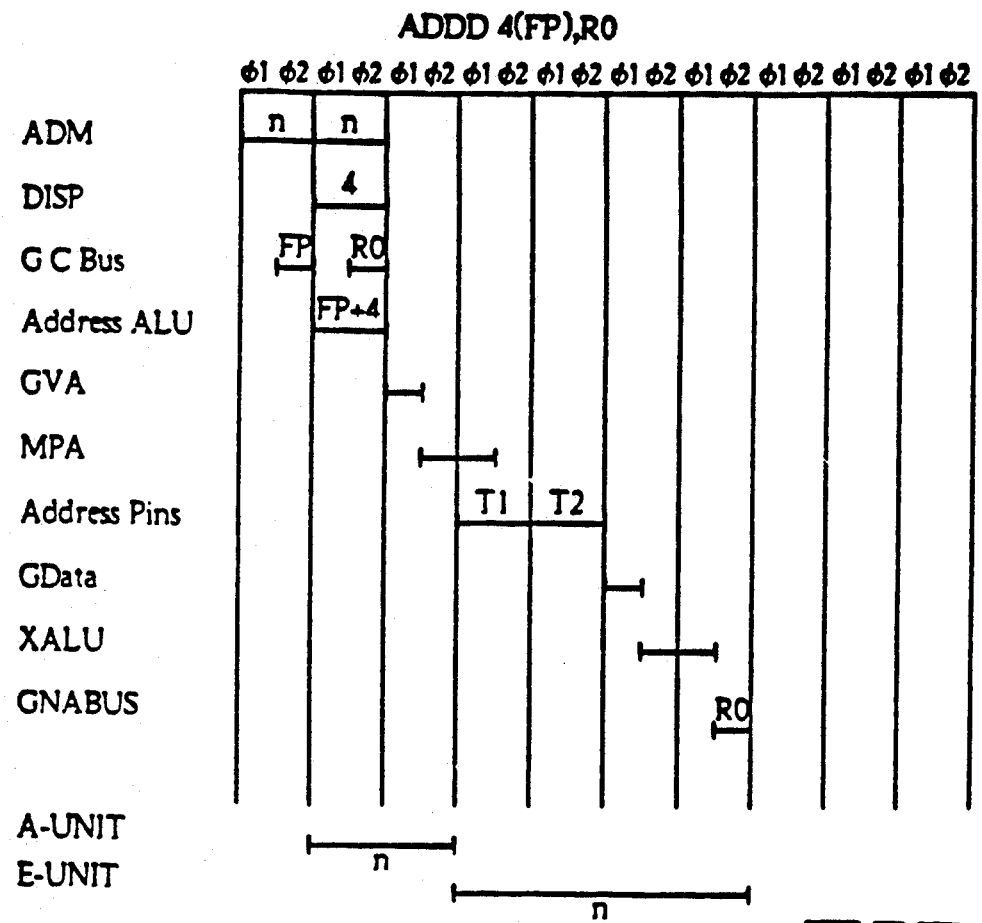
FIG. 15 is a timing diagram illustrating Pipeline timing for an internal Data Cache miss.

FIG. 15 shows the effect of a Data Cache 16 miss on the timing of Pipeline 12. Execution Unit 32 is delayed by two cycles until BIU 20 completed the bus cycles to read data.

Figure 16:
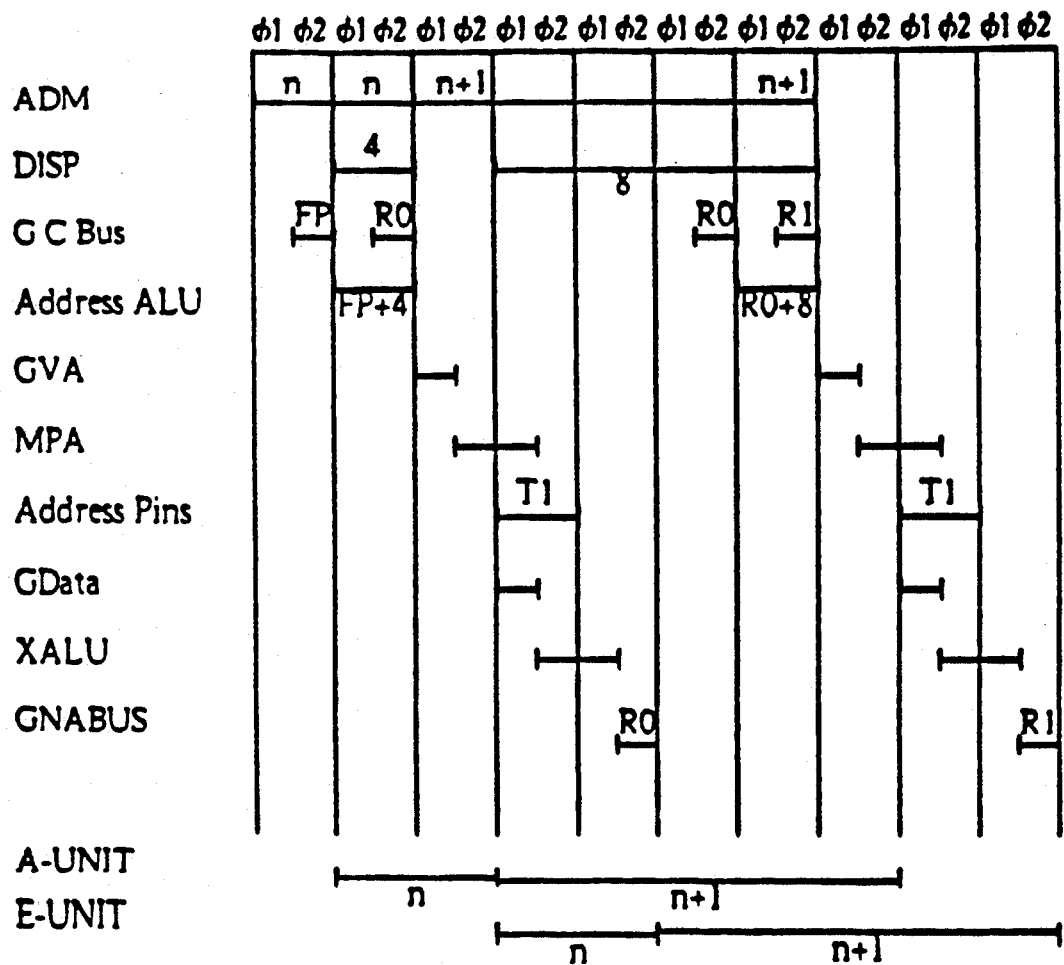
FIG. 16 is a timing diagram illustrating the effect of an address-register interlock on instruction Pipeline timing.

FIG. 16 shows the effect of an address-register interlock on the timing of Pipeline 12: one instruction is modifying a register while the next instruction uses that register for an address calculation. Address Unit 30 is delayed by three cycles until Execution Unit 32 completes the register's update. Note that if the second instruction had used the register for a data value rather than an address calculation (e.g., ADDD R0, R1), then bypass circuitry in Execution Unit 32 would be used to avoid any delay to Pipeline 12.

Loader 28 includes special circuitry for the handling of branch instructions. When a branch instruction is decoded, Loader 28 calculates the destination address and selects between the sequential and non-sequential instruction streams. The selection is based on the branch condition and direction. If Loader 28 predicts that the branch is taken, then the destination address is transferred to Instruction Cache 14 on the JBUS. Whether or not the branch is predicted to be taken, Loader 28 saves the address of the alternate instruction stream. Later the branch instruction reaches Execution Unit 32, where the condition is resolved. Execution Unit 32 signals Loader 28 whether or not the branch was taken. If the branch had been incorrectly predicted, Pipeline 12 is flushed, and Instruction Cache 14 begins prefetching instructions from the correct stream.

Figure 17:
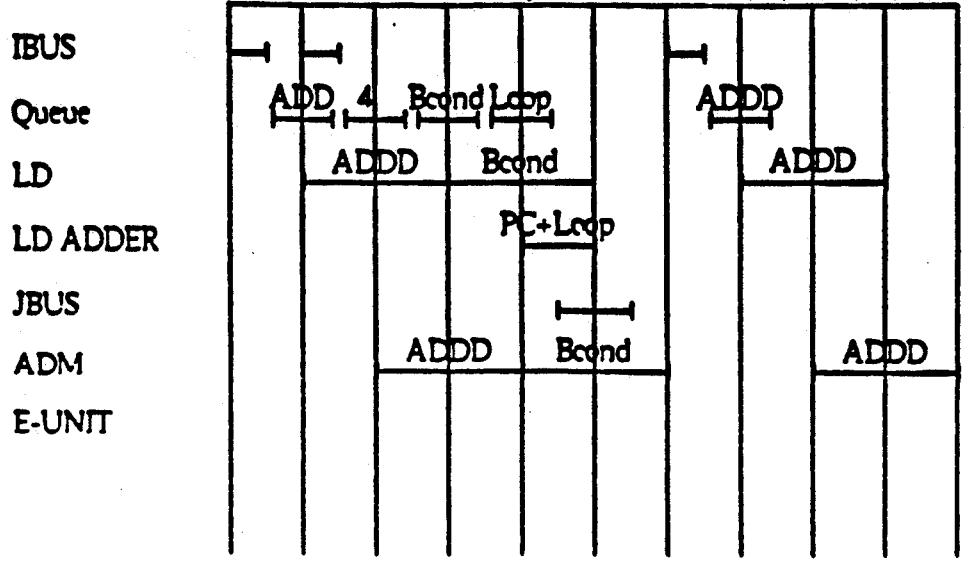
FIG. 17 is a timing diagram illustrating the effect of correctly predicting a branch instruction to be taken in the operation of the microprocessor described herein.

FIG. 17 shows the effect of correctly predicting a branch instruction to be taken. A 2-cycle gap occurs in the decoding of instructions by Loader 28. This gap at the very top of Pipeline 12 can often be closed because one fully decoded instruction is buffered between Loader 28 and Address Unit 30 and because other delays may arise simultaneously at later stages in pipeline 12.

Figure 18:
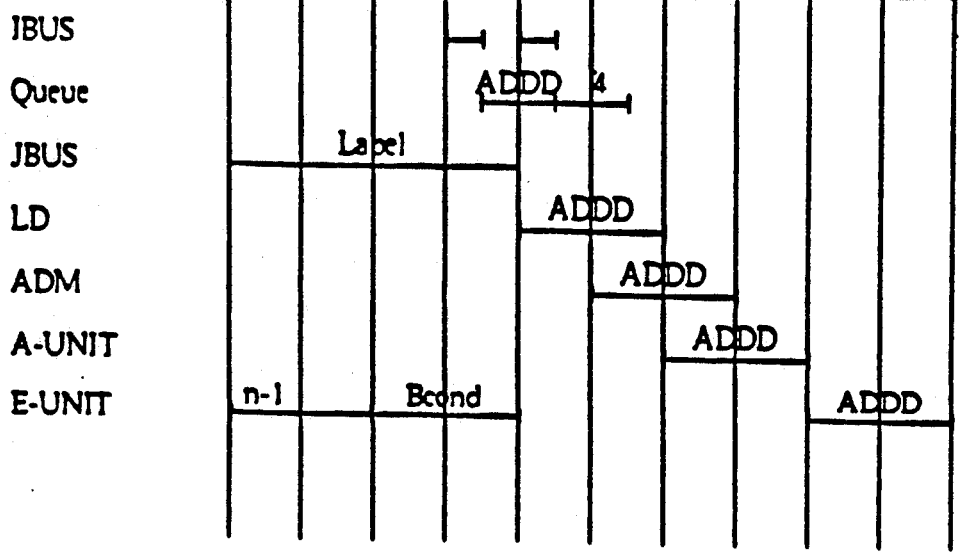
FIG. 18 is a timing diagram illustrating the effect of incorrectly predicting the resolution of a branch instruction in the operation of the microprocessor described herein.

FIG. 18 shows the effect of incorrectly predicting the resolution of a branch instruction. A 4-cycle gap occurs at Execution Unit 32.

Additional information regarding the operation of CPU 10 may be found in copending and commonly-assigned U.S. patent application Ser. No. 006,016, "High Performance Microprocessor", filed by Alpert et al of even date herewith, and which is hereby incorporated by reference.

It should be understood that various alternatives to the embodiment shown herein may be employed in practicing the present invention. It is intended that the following claims define the invention, and the structure and methods within the scope of these claims and their equivalents be covered thereby.

What is claimed is:

1. In an integrated circuit microprocessor that executes a sequence of instructions, each instruction in turn causing execution by the microprocessor of a corresponding sequence of microprogram instructions by the microprocessor, the microprocessor having an external interface, the improvement comprising apparatus for monitoring the sequence of instructions executed by the microprocessor, the apparatus comprising means for activating an interface signal which indicates whether an instruction beginning execution by the microprocessor is a sequential instruction or a non-sequential instruction and means for providing information on the external interface which indicates when a taken branch or jump instruction is executed by the microprocessor or an exception occurs.

2. Apparatus as in claim 1 wherein the means for activating comprises means for activating the interface signal when a taken branch instruction is executed.

3. Apparatus as in claim 2 and further comprising means for transferring control to a destination instruction the address of which is calculated from the encoding and address of the taken branch instruction.

4. Apparatus as in claim 1 and further comprising means for inactivating the interface signal if the branch instruction is not taken.

5. Apparatus as in claim 4 and further comprising means for transferring control to the instruction sequentially following the branch instruction in memory.

6. Apparatus as in claim 1 and further comprising means for providing on the interface, when an exception occurs, a code that indicates the type of exception.

7. Apparatus as in claim 6 and further comprising means for providing on the interface the virtual address of corresponding exception service procedure.

8. Apparatus as in claim 1 and further comprising means for instruction is executed, the virtual address of a jump destination.

9. Apparatus as in claim 8 and further comprising means for providing on the interface the destination address after the microprocessor has begun fetching the instruction at the jump destination.

10. A method of monitoring the sequence of instructions executed by an integrated circuit microprocessor having an external interface and wherein each instruction in turn causes execution by the microprocessor of a corresponding sequence of microprogram instructions by the microprocessor, the method comprising
    generating an interface signal which indicates whether an instruction beginning execution by the microprocessor is a sequential instruction or a non-sequential instruction; and
    providing information on the external interface which indicates when a taken branch instruction is executed or an exception occurs.

11. A method as in claim 10 including the further step of activating the interface signal when a taken branch instruction is executed.

12. A method as in claim 10 including the further step of providing on the interface, when an exception occurs, a code indicating the type of execution.

13. A method as in claim 12 including the further step of providing on the interface the virtual address of a corresponding exception service procedure.

14. A method as in claim 10 and including the further step of providing on the interface, when a taken jump instruction is executed, the virtual address of a jump destination.

15. A method as in claim 14 and including the further step of providing on the interface the destination address after the microprocessor has begun fetching the instruction at the jump destination.

16. A method for monitoring the sequence of instructions executed by a central processing unit having an external interface, the method comprising:
    (a) generating an interface signal representative of the execution of a branch instruction, the interface signal being of a first state if the branch is taken and being of a second state if the branch is not taken and
        (i) if the interface signal is of the first state, transferring central processing unit control to a destination instruction having an address calculated using encoding and address information of the branch instruction; and
        (ii) if the interface signal is of the second state, transferring central processing unit control to the next sequential instruction following the branch instruction; and
    (b) displaying information on the interface representative of the execution of a taken jump instruction or the occurrence of an exception such that
        (i) when an exception occurs, a code is displayed indicating the type of exception and the memory location of an associated exception service procedure; and
        (ii) when a taken jump instruction is executed, the memory location of the jump destination instruction is displayed.

* * * * *

UNITED STATES PATENT AND TRADEMARK OFFICE
CERTIFICATE OF CORRECTION

PATENT NO. : 5,263,153

DATED : November 16, 1993

INVENTOR(S) : Amos Intrater and Donald B. Alpert

It is certified that error appears in the above - identified patent and that said Letters Patent is hereby corrected as shown below:

In Col. 19, line 12, after "for" insert

--providing on the interface, when a taken jump--.

Signed and Sealed this

Nineteenth Day of April, 1994

Attest:

BRUCE LEHMAN

Attesting Officer

Commissioner of Patents and Trademarks